(No Model.)

L. T. JONES.
BASKET TRUCK.

No. 305,007. Patented Sept. 9, 1884.

WITNESSES:
A. C. Eader
John E. Morris

INVENTOR:
Leven T. Jones
By Chas. B. Mann
Attorney.

UNITED STATES PATENT OFFICE.

LEVIN T. JONES, OF BALTIMORE, MARYLAND.

BASKET-TRUCK.

SPECIFICATION forming part of Letters Patent No. 305,007, dated September 9, 1884.

Application filed May 6, 1884. (No model.)

*To all whom it may concern:*

Be it known that I, LEVIN T. JONES, a citizen of the United States, residing at Baltimore, in the State of Maryland, have invented certain new and useful Improvements in Basket-Trucks, of which the following is a specification.

My invention relates to a wheeled truck adapted especially for carrying receptacles having bail-handles, such as baskets and buckets.

The object of the invention is to provide a truck having certain features—to wit: first, so light in weight that it may, together with a basket or other bail-handled receptacle fastened to it, be picked up and carried by the bail-handle without inconvenience; second, having a seat without sides and of dimensions adapted for a market-basket of minimum size, and supported above the rims of the wheels in such manner that no part of the running-gear will project beyond the seat, whereby baskets of various sizes may be carried on the seat without any part of the truck projecting beyond the basket, thus, as the truck occupies no additional room, enabling the truck and basket to be taken in among a crowd of people (for instance, a crowded market) without any greater difficulty on that account than now exists in taking a basket alone in such a crowd; and a third object is to provide means attached to the truck for fastening a basket or other bail-handled receptacle so as to retain it to the seat.

Figure 1:
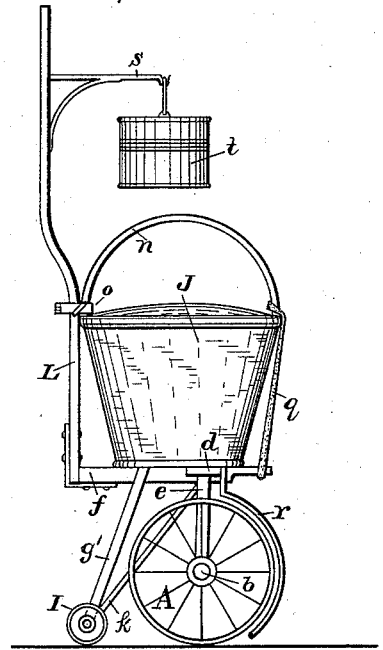
Figure 2:
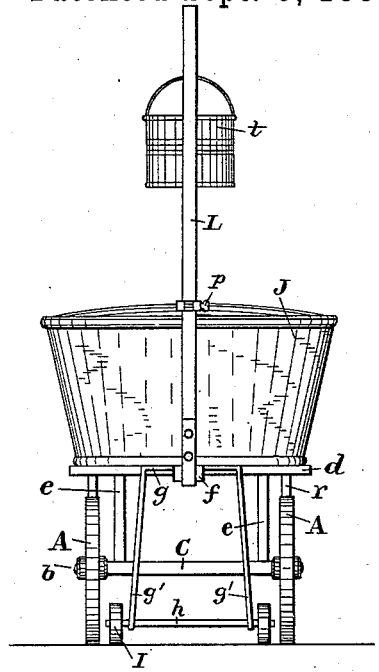
Figure 3:
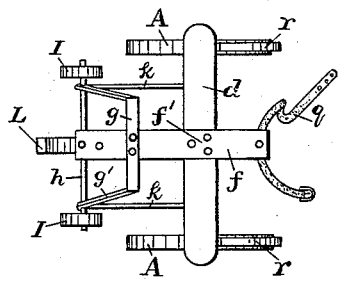
Figure 4:
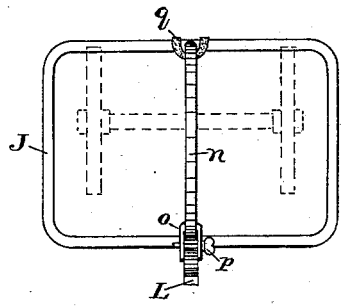
Figure 5:
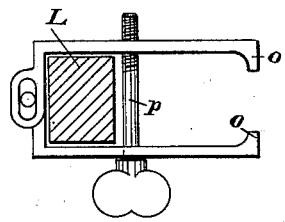

In the drawings which illustrate the invention, Figure 1 is a side view of the truck and basket. Fig. 2 is a rear view of same. Fig. 3 is a top view of the truck alone. Fig. 4 is a top view of the basket as seen when on the truck. Fig. 5 is a view of a device to fasten the basket and thereby hold it to the truck-seat.

The letter A designates two wheels, which are mounted on the arms $b$ of an axle, C.

The seat consists, in part, of a transverse bar, $d$, supported high enough above the axle to project over the rims of the wheels by standards $e$, which rest on and are secured to the axle C. A bar, $f$, crosses the transverse bar, and is secured to it by rivets or bolts $f'$. This bar is also crosswise of the axle. An iron bar, $g$, crosses the bar $f$ in the same direction as the transverse bar $d$, and each end of this bar is bent down and forms standards $g'$, which serve as bearings for the axle $h$ of the two rear wheels or rollers, I. The transverse bar $d$, bar $f$, and bar $g$ are all on the same plane, and together constitute a seat for the basket or receptacle J. As this seat is a mere open frame or skeleton, it may be made very light, which is a desideratum. The standards $g'$, which are supported by the rear rollers, I, are braced by the reaches $k$ to give them the desired stability. An upright handle, L, is secured at the rear side of the seat, and projects up therefrom substantially at right angles. In the present instance it is made fast to the end of the bar $f$ above the rear rollers. The handle and cross-bar $f$ may be one piece, bent substantially to the shape shown. As the handle is at one side only of the seat, it is no obstruction at all to the basket or receptacle, and a basket having a bottom of larger dimension than the seat may readily set thereon, one side of the basket being in contact with the handle. The basket is fastened so that it will keep its position on the truck-seat by the basket-handle $n$ being secured to the upright truck-handle L. A strap having a buckle may be used for this purpose, or a clamp such as shown in Fig. 5 may be employed. The clamp shown has two jaws, $o$, pivoted together, and tightened by a screw, $p$. At one side of the screw the clamp takes about the upright truck-handle L, and is always attached thereto, and at the other side are the jaws $o$, which grasp the handle $n$ at one side of the basket. A device of this kind will fasten the basket and ordinarily retain it securely to the seat. For further security, however, a strap, $q$, attached to the front end of the handle cross-bar $f$, may be passed about the handle at the other side of the basket, as seen in Figs. 1 and 4. This, with the other device, will effectually confine the basket. Guards $r$, attached to the seat, extend down in front of the two wheels A, and prevent the wheels from rubbing against the apparel of persons. A hook, $s$, is attached to the upright handle and projects toward the front over the seat. This hook serves to suspend a bucket or kettle, $t$, directly over the basket J. A bucket carried in this position takes up no additional room, considered in the vertical direction.

This truck will carry baskets, buckets, and such like bundles, and the shape of its parts adapt it especially to be taken along crowded pavements and in markets among many people, and the truck with a basket or similar load fastened upon it may, if occasion require, be conveniently lifted and carried.

Having described my invention, I claim and desire to secure by Letters Patent of the United States—

1. A truck for market-baskets, consisting of a seat for the basket, mounted on wheels, and an upright handle attached to one side only of the seat, and projecting up from the seat substantially at a right angle, whereby a basket of any size may sit on the seat and one side of the basket be in contact with the handle, as set forth.

2. A truck for market-baskets, consisting of a seat for the basket, mounted on wheels, a handle attached to and projecting up from the seat, and a strap or equivalent device for fastening the basket to its position on the seat, as set forth.

3. A truck for market-baskets, consisting of wheels and the arms on which they revolve, a seat for the basket, supported above the rim of the wheels, a handle projecting up from one side only of the seat, and a strap or equivalent device for fastening the basket to its position on the seat, as set forth.

4. A truck for market-baskets, consisting of a seat for the basket, mounted on wheels, an upright handle attached to and projecting up from one side only of the seat, and a hook, $s$, attached to the said handle and projecting toward the front, whereby a bucket may be suspended over the seat, as set forth.

In testimony whereof I affix my signature in presence of two witnesses.

LEVIN T. JONES.

Witnesses:
JOHN E. MORRIS,
CHAS. B. MANN.